(12) United States Patent
Bruer et al.

(10) Patent No.: US 10,021,827 B2
(45) Date of Patent: Jul. 17, 2018

(54) TWIN ROW PLANTER

(71) Applicant: American Made Equipment Inc., Eldora, IA (US)

(72) Inventors: Dusko Bruer, Eldora, IA (US); Timothy J. Manning, Eldora, IA (US)

(73) Assignee: AMERICAN MADE EQUIPMENT INC., Eldora, IA (US)

( * ) Notice: Subject to any disclaimer, the term of this patent is extended or adjusted under 35 U.S.C. 154(b) by 29 days.

(21) Appl. No.: 15/252,857

(22) Filed: Aug. 31, 2016

(65) Prior Publication Data

US 2017/0055438 A1  Mar. 2, 2017

Related U.S. Application Data

(60) Provisional application No. 62/212,356, filed on Aug. 31, 2015.

(51) Int. Cl.
*A01C 7/18* (2006.01)
*A01C 7/20* (2006.01)
*A01C 7/08* (2006.01)

(52) U.S. Cl.
CPC .............. *A01C 7/201* (2013.01); *A01C 7/208* (2013.01); *A01C 7/081* (2013.01)

(58) Field of Classification Search
CPC ......... A01C 7/081; A01C 7/042; A01C 7/201; A01C 7/203; A01C 5/066; A01C 5/068; A01C 7/208
See application file for complete search history.

(56) References Cited

U.S. PATENT DOCUMENTS

| | | | | |
|---|---|---|---|---|
| 1,841,236 A * | 1/1932 | Zaback | ............... | A01C 5/066 |
| | | | | 111/198 |
| 5,476,147 A | 12/1995 | Fixemer | | |
| 6,520,100 B1* | 2/2003 | Spooner, Sr. | .......... | A01C 7/102 |
| | | | | 111/52 |
| D762,738 S * | 8/2016 | Dal Moro | ............... | D15/27 |
| 9,526,201 B2* | 12/2016 | Wendte | ............... | A01C 19/02 |
| 2009/0007828 A1 | 1/2009 | Johnson | | |
| 2014/0116306 A1* | 5/2014 | Sharp | ............... | A01C 7/127 |
| | | | | 111/163 |
| 2016/0192580 A1* | 7/2016 | Wendte | ............... | A01C 19/02 |
| | | | | 111/177 |
| 2017/0295717 A1* | 10/2017 | Brockmeier | ............. | A01C 7/04 |

FOREIGN PATENT DOCUMENTS

| | | | | |
|---|---|---|---|---|
| CA | 2927769 A1 * | 12/2016 | ............ | A01C 7/201 |
| RU | 2061349 | 6/1996 | | |
| RU | 2243635 | 1/2005 | | |

\* cited by examiner

*Primary Examiner* — John Weiss
(74) *Attorney, Agent, or Firm* — Duane Morris LLP; J. Rodman Steele, Jr.; Gregory M. Lefkowitz

(57) ABSTRACT

A multi-row planting unit includes a first planting assembly coupled to a mounting plate and a second planting assembly coupled to the mounting plate. Each of the first planting assembly and the second planting assembly are configured to dispense a solid from a metering unit. The metering unit of the first planting assembly is positioned to dispense the solid at a predetermined spacing with respect to the solid dispensed from the metering unit of the second planting assembly.

19 Claims, 17 Drawing Sheets

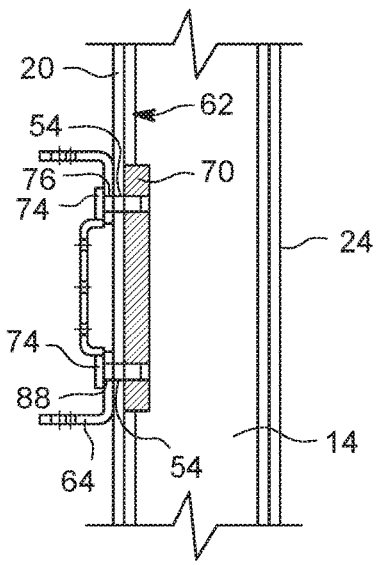
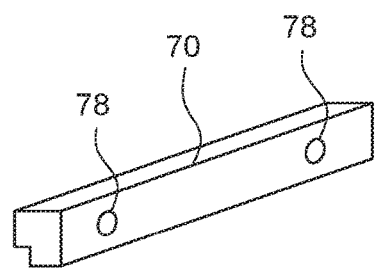
FIG. 2A
FIG. 2C
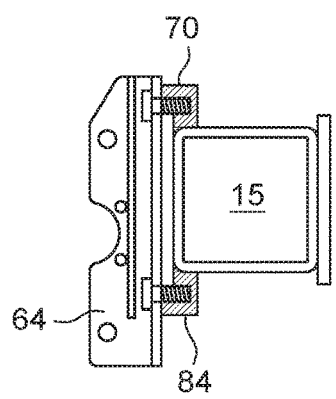
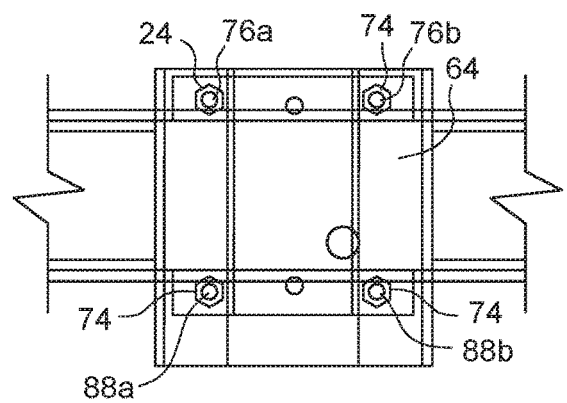
FIG. 2B
FIG. 2D

TWIN ROW PLANTER

CROSS-REFERENCE TO RELATED APPLICATIONS

This application claims benefit under 35 U.S.C. § 119(e) to U.S. Provisional Patent Application Ser. No. 62/212,356, filed on Aug. 31, 2015, and entitled "TWIN ROW PLANTER," which is hereby incorporated by reference in its entirety.

FIELD OF THE INVENTION

The present invention relates generally to the field of tools, and more particularly to a platform that is useful for holding multiple tools.

BACKGROUND

Planters are known to be useful as equipment for sowing crops on a field and other agricultural applications. Planters are often needed for large-scale farming operations. Conventional planters have bins arranged in one or more rows for dispensing seeds or fertilizer as the planter is towed behind a tractor. The most common spacing for rows in the United States is 30 inches apart, and the planter units can provide precision sowing according to the type of seed to be sown and the rate at which the seeds are to be sown. While conventional planters may be useful in some instances, there are still numerous deficiencies and the potential for more useful planters and planter accessories for the modern farming industry.

SUMMARY

In various embodiments, a multi-row planting unit is disclosed. The multi-row planting unit includes a first planting assembly coupled to a mounting plate and a second planting assembly coupled to the mounting plate. Each of the first planting assembly and the second planting assembly are configured to dispense a solid from a metering unit. The metering unit of the first planting assembly is positioned to dispense the solid at a predetermined spacing with respect to the solid dispensed from the metering unit of the second planting assembly.

In various embodiments, a system for dispensing a solid is disclosed. The system includes a planter bar and a multi-row planting unit. The multi-row planting unit includes a mounting plate configured to be coupled to the planter bar, a first planting assembly coupled to the mounting plate, and a second planting assembly coupled to the mounting plate. Each of the first planting assembly and the second planting assembly are configured to dispense a solid from a metering unit. The metering unit of the first planting assembly is positioned to dispense the solid at a predetermined spacing with respect to the solid dispensed from the metering unit of the second planting assembly.

In various embodiments, a method of dispensing a solid is disclosed. The method includes coupling a multi-row planting unit to a vehicle. The multi-row planting unit includes a mounting plate configured to be coupled to a planter bar, a first planting assembly coupled to the mounting plate, and a second planting assembly coupled to the mounting plate. The method further includes pulling the multi-row planting unit behind the vehicle at a predetermined rate of speed and dispensing a solid from a metering unit in each of the first and second planting assemblies. The metering unit of the first planting assembly is positioned to dispense the solid at a first predetermined spacing with respect to the solid dispensed from the metering unit of the second planting assembly.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein:

FIG. 2A is a top cross-sectional view of a planter bar-mounting plate attachment arrangement shown in FIG. 1.

FIG. 2B is a side view of the planter bar-mounting plate attachment arrangement of FIG. 2A.

FIG. 2C is a perspective view of the clip shown in FIG. 2A.

FIG. 2D is a partially transparent front view of the planter bar-mounting plate attachment arrangement of FIG. 2A.

DETAILED DESCRIPTION

Figure 1:
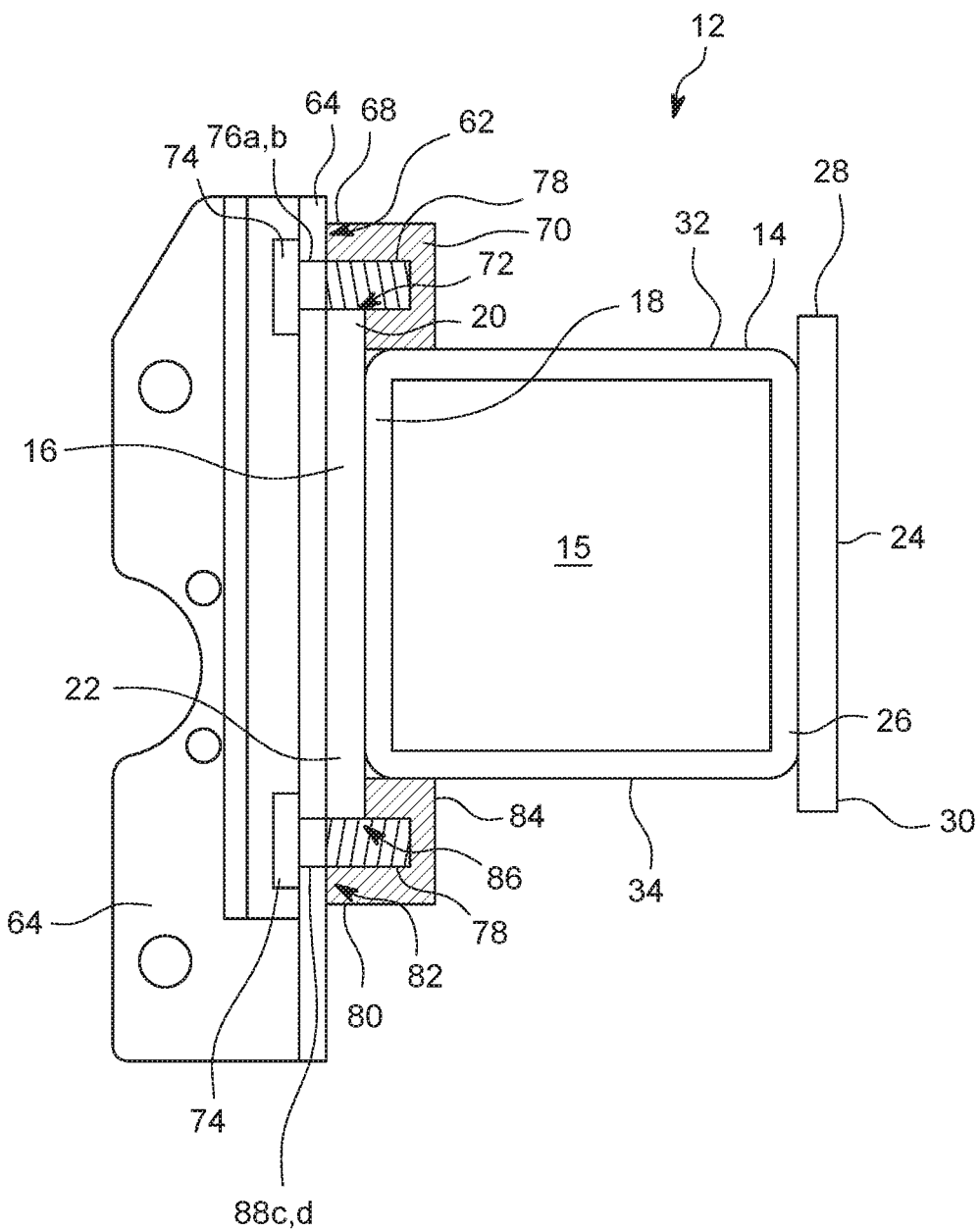
FIG. 1 illustrates one embodiment of a side cross-sectional view of a mounting plate clipped to a planter bar, in accordance with the present disclosure
Figure 3:
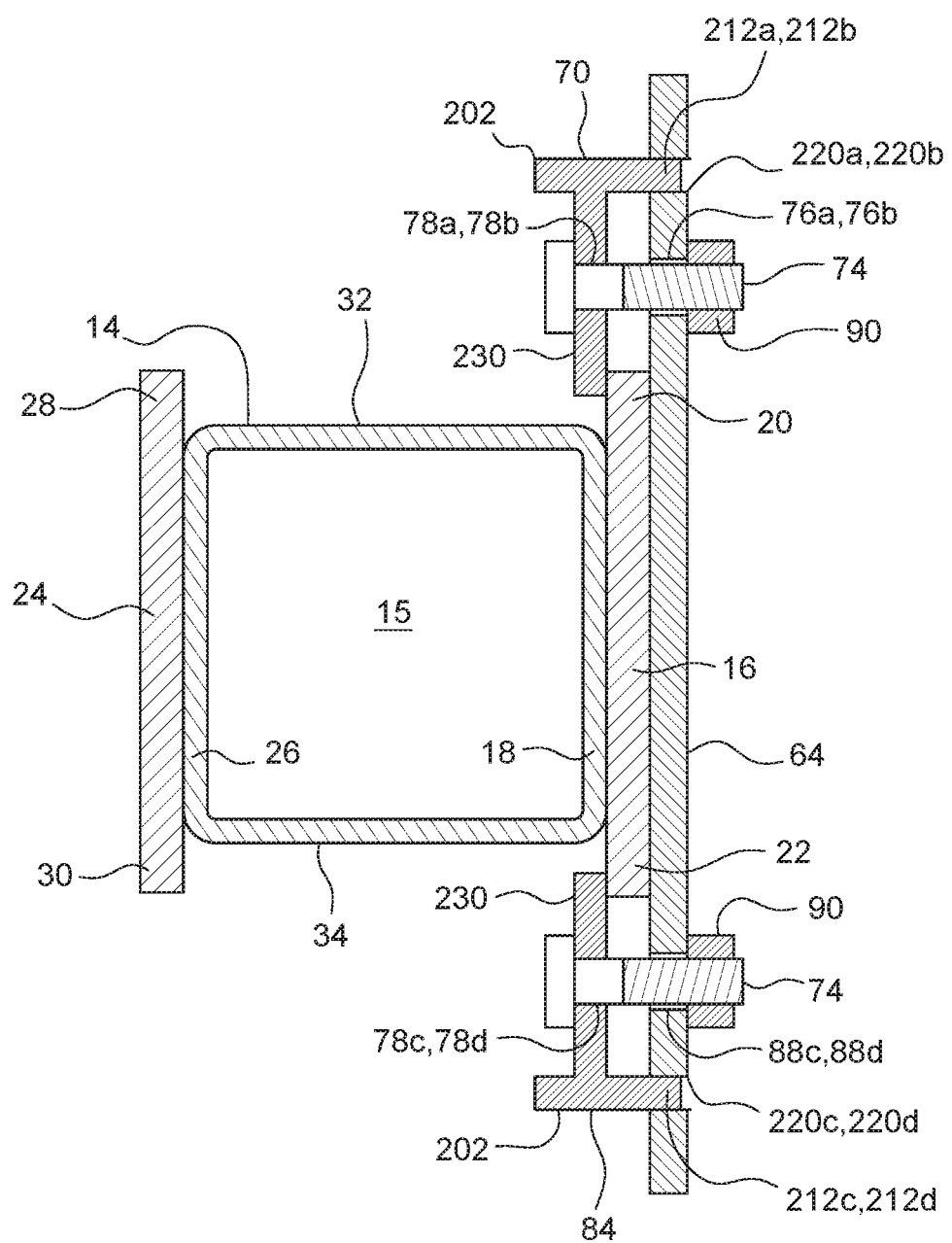
FIG. 3 illustrates one embodiment of a side cross-sectional view of a mounting plate clipped to a planter bar, using the clips and mounting plates, in accordance with the present disclosure.
Figure 4:
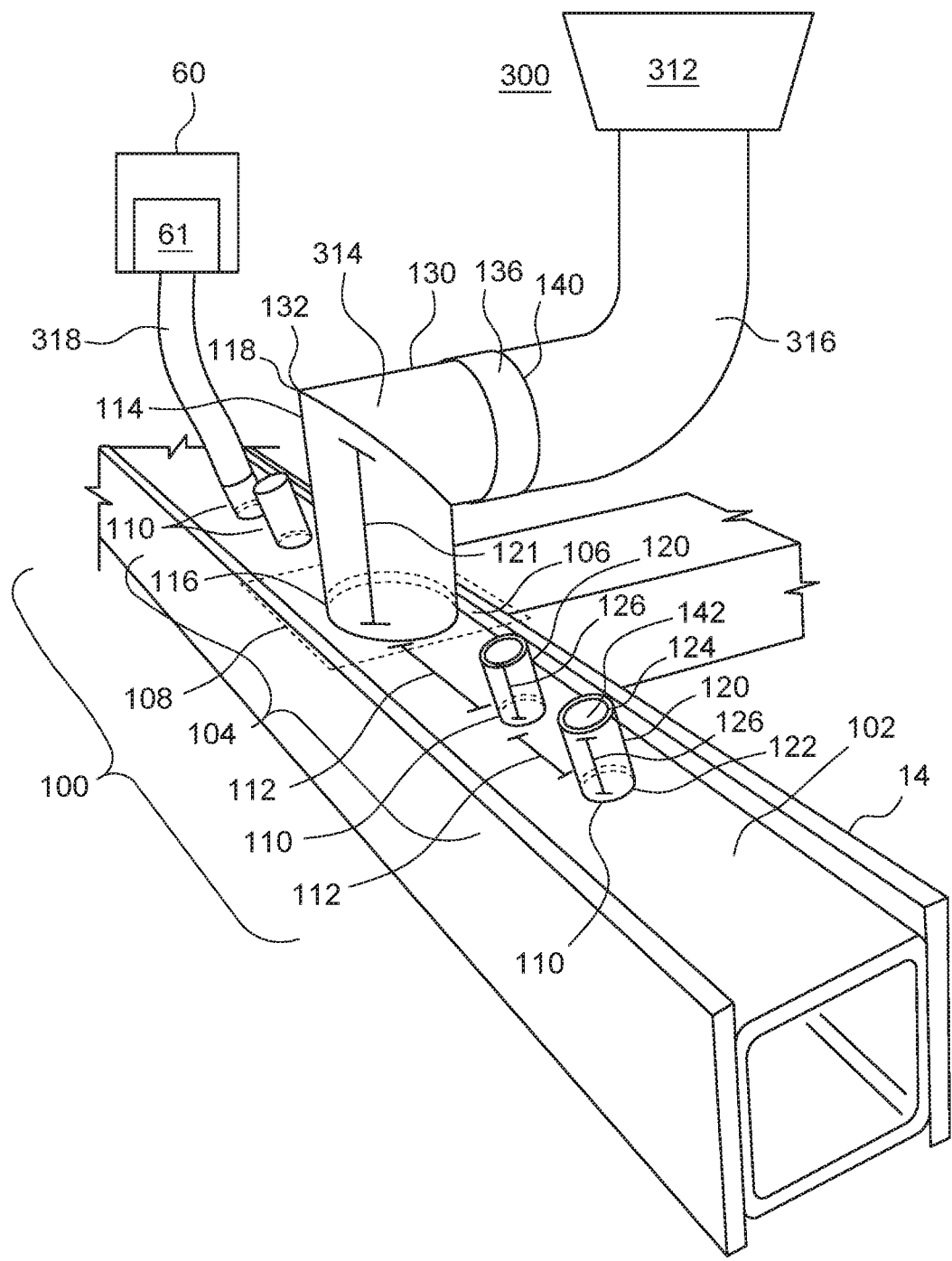
FIG. 4 illustrates one embodiment of a perspective view of a portion of a planter bar that incorporates an air handling system for distributing air and/or solids to moveable units (e.g., planter units) attached to the planter bar, in accordance with the present disclosure.
Figure 5:
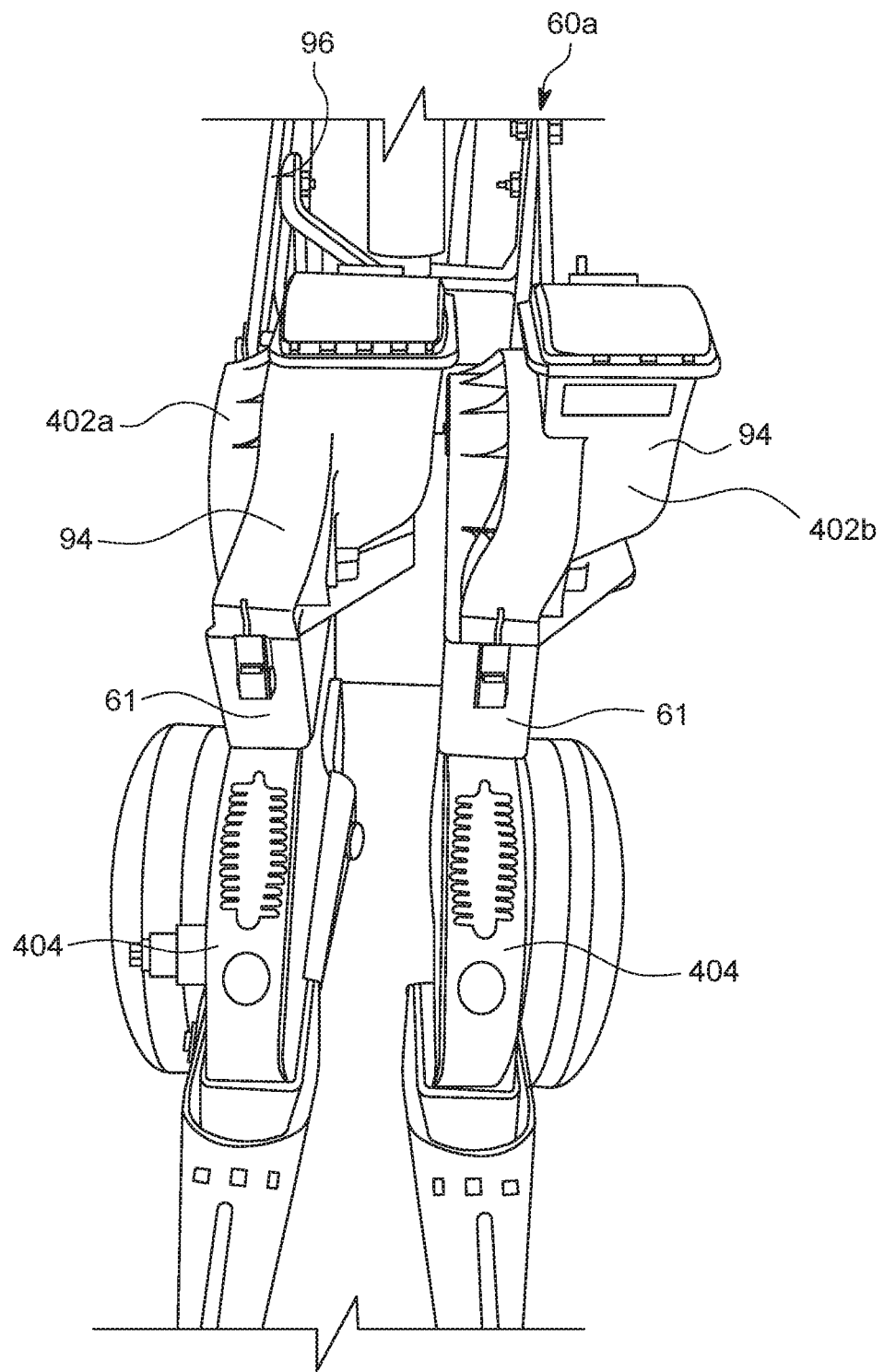
FIG. 5 illustrates one embodiment of a side-by-side two-row planter configured to couple to a planter bar, in accordance with the present disclosure.

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise, and includes terms such as "directly" coupled, secured, etc. The term "operatively coupled" is such an attachment, coupling, or connection that allows the pertinent structures to operate as intended by virtue of that relationship.

In various embodiments, a two-row planter is disclosed. The two-row planter is configured to couple to a planter bar and planter mounting system providing universally adjustable row and accessory spacing. The two-row planter includes a first planter assembly and a second planter assembly coupled to a common lifting portion. The first and second planter assemblies each include a hopper, a metering unit, and a support structure. The two-row planter may be configured in a side-by-side configuration or a staggered configuration.

FIGS. 1-4 illustrate a multi-row planter system 10. The multi-row planter system 10 can include a planter bar 12. The planter bar 12 can include a horizontal support bar 14, a first plate member 16 coupled to the trailing side 18 of the support bar 14, and a second plate member 24 coupled to the leading side 26 of the support bar 14, wherein the leading side 26 is opposite the trailing side 18. In some embodiments, the first plate member 16 forms an upper, trailing rail 20 that extends above the trailing side 18 of the support bar 14, a lower trailing rail 22 that extends below the trailing side 18 of the support bar 14, or both 20, 22. In some embodiments, the second plate member 24 forms an upper leading rail 28 that extends above the leading side 26 of the support bar 14, a lower leading rail 30 that extends below the leading side 26 of the support bar 14, or both 28, 30.

The first plate member 16 and the second plate member 24 can be welded to the support bar 14. Welding the plate members 16, 24 to the support bar 14 provides additional support for the support bar 14 and eliminates the need for trussing or additional reinforcement against bending. Thus, in some embodiments, there is no trussing or additional bending reinforcement within the support bar, external to the support bar, or both.

In some embodiments, the multi-row planter system 10 is adapted for coupling to a vehicle positioned proximate the leading side 26. In some embodiments, the upper fastener 68 can include an upper clip 70 that extends over an upper edge 72 of the upper trailing rail 20 and contacts the inside surface 62 of the upper trailing rail 20. In some embodiments, the upper clip 70 is coupled to the mounting plate 64 by at least one threaded faster 74 (e.g., a screw or a bolt). In some embodiments, the upper clip 70 can be adapted to receive the threaded fasteners 74 via at least one clip orifice 78. In some embodiments, the at least one clip orifice 78 can be threaded, while the clip orifice 78 is not threated in other embodiments. In embodiments were the clip orifice 78 is not threaded, the threaded fastener 74 can be secured with a nut 90.

In some embodiments, the upper clip 70 is coupled to the mounting plate 64 by at least two threaded fasteners 74a, 74b. In some embodiments, the mounting plate 64 can include at least two upper mounting plate orifices 76a, 76b that are spaced apart by the same distance as the corresponding clip orifices 78a, 78b.

In some embodiments, the upper and/or lower trailing rails 20/22, 28/30 are free of any obstructions for the clips 60, 70 used to secure the mounting plates 64 to the planter bar 12. This results in a clear rail, which allows the mounting plate 64 to slide along the rails 20/22 or 28/30 from adjacent to the master opening 106 to the end of the planter bar 12 without needing to completely remove either clip 60, 70 from the mounting plate 64. In some embodiments, a majority (>50%) of the length of the first plate member 16, the second plate member 24, or both, on each side of a mid-point of the planter bar 12 comprises a continuous clear rail. In some embodiments, at least 70%, or at least 75%, or at least 80%, or at least 85% of the length of the first plate member 16, the second plate member 24, or both, on each side of a mid-point of the planter bar 12 comprises a continuous clear rail. As used herein, "continuous clear rail" refers to a continuous segment of clear rail and not the total of multiple separate portions of clear rail In some embodiments, the upper clip 70 includes a base portion 202 having a top surface 204 and a bottom surface 206, where a plurality of apertures 208 extend from the top surface 204 to the bottom surface 206. The base portion 202 of the upper clip 70 can include any number of apertures 208 that enables the upper clip 70 to function as described herein. For example, the base portion 202 can include three apertures 208 such that adjacent apertures 208 are spaced an equal distance 210 from each other. A planter system is described in U.S. patent application Ser. No. 14/634,076, filed on Feb. 27, 2015, and entitled "ADJUSTABLE PLANTER BAR SYSTEM," the disclosure of which is incorporated herein in its entirety.

In some embodiments, the multi-row planter system 10 includes at least one multi-row planting unit 60 coupled to the planter bar 12 by a mounting plate 64. FIGS. 5-11 illustrate one embodiment of a side-by-side multi-row planting unit 60a. In some embodiments, the side-by-side multi row planting unit 60a includes a mounting plate 64. The mounting plate 64 can be coupled to an inside surface of the upper trailing rail 20 and the lower trailing rail 22. In some embodiments, at least one multi-row planting unit 60a includes a mounting plate 64 adjacent to an outside surface 66 of the first plate member 16 extending from the outside surface 66 of the first plate member 16 and contacting the inside surface 62. In some embodiments, the at least one upper fastener 68 is adjustably coupled to the mounting plate 64.

In some embodiments, the multi-row planting unit 60 includes a lifting unit (elevator) 96 coupled to the mounting plate 64. A first planting assembly 402a and a second planting assembly 402b (collectively "planting assemblies 402") are coupled to the lifting unit 96. Each of the planting assemblies 402 includes a support frame 404 supporting a hopper 94, a dispensing portion, and a metering unit 61. In some embodiments, the hopper 94 is sized and configured to fit within a retaining opening 406 formed in the support frame 404. The hopper 94 includes a vacuum connection 318 for coupling the hopper 94 to a vacuum system (not shown). In some embodiments, the vacuum system is formed integrally with and/or coupled to any portion of the multi-row planting unit 60, such as a planting assembly 402, a support frame 404, the hopper 94, the metering unit 61, and/or any other portion of the multi-row planting unit 60. In some embodiments, the vacuum system is located remotely from the multi-row planting unit 60.

In some embodiments, each of the support frames 404 includes a distal wheel assembly 408. The distal wheel assembly 408 includes a first distal wheel 410a and a second distal wheel 410b (collectively "distal wheels 410") coupled a distal wheel axle 412. The distal wheel axle 412 provides a range of movement to the distal wheels 410 such that the distal wheels 410 can traverse uneven ground without changing the alignment/positioning of the support frame 404. For example, in some embodiments, the distal wheels 410 are coupled to a distal wheel axle 412 that provides vertical movement of the distal wheels 410 within a predetermined range.

In some embodiments, an angle control 414 allows a user to adjust the distal wheel assembly 408 with respect to the support frame 404 to one or more predetermined angles. Such as, for example, 15°, 30°, 45°, 60°, and/or any angle substantially within a range of 0°-75°. The predetermined angles can be indicated by positions within a notched plate 416. For example, in some embodiments, the notched plate 416 includes a plurality of notches 418 each corresponding to a predetermined angular relationship between the distal wheel assembly 408 and the support frame 404. In some embodiments, each of the notches can provide a predetermined angular adjustment, such as for example, 1°, 2°, 3°, 4°, 5°, 10° and/or any other suitable adjustment per notch 418. In some embodiments, each of the notches 418 corresponds to a one of a plurality of predetermined angles between the distal wheel assembly 408 and the support frame 404.

In some embodiments, one or more distal wheel assemblies 408 can be replaced with an aeration assembly 450. The aeration assembly 450 includes a first aeration wheel 452a mounted on a first side of the support frame 404 and a second aeration wheel 452b mounted on a second side of the support frame 404. Each of the aeration wheels 452 include a plurality of spikes 454 configured to aerate a section of ground when the planting assembly 402 is in use. In use, the aeration wheels 452a, 452b are lowered into contact with the ground. As the aerator assembly 450 is moved horizontally along the ground (for example, as propelled by a tractor or other vehicle) the aerator wheels 452a, 452b rotate and drive the plurality of spikes 454 into and out of the ground to create aeration cavities in the ground.

In some embodiments, each of the planting assemblies 402 include a proximal wheel 418. The proximal wheel 418 is coupled to and supports a rear section of the support frame 404. In some embodiments, the proximal wheel 418 is coupled to the support frame 404 in a fixed position. In some embodiments, the proximal wheel 418 is adjustable. For example, a height control 420 can be coupled to the proximal wheel 418 to allow the use to adjust the height of the proximal wheel 418 with respect to the support frame 404. In some embodiments, the proximal wheel 418 can be raised and/or lowered within a predetermined range to raise and/or lower the proximal portion of the planting assemblies 402.

Figure 6:
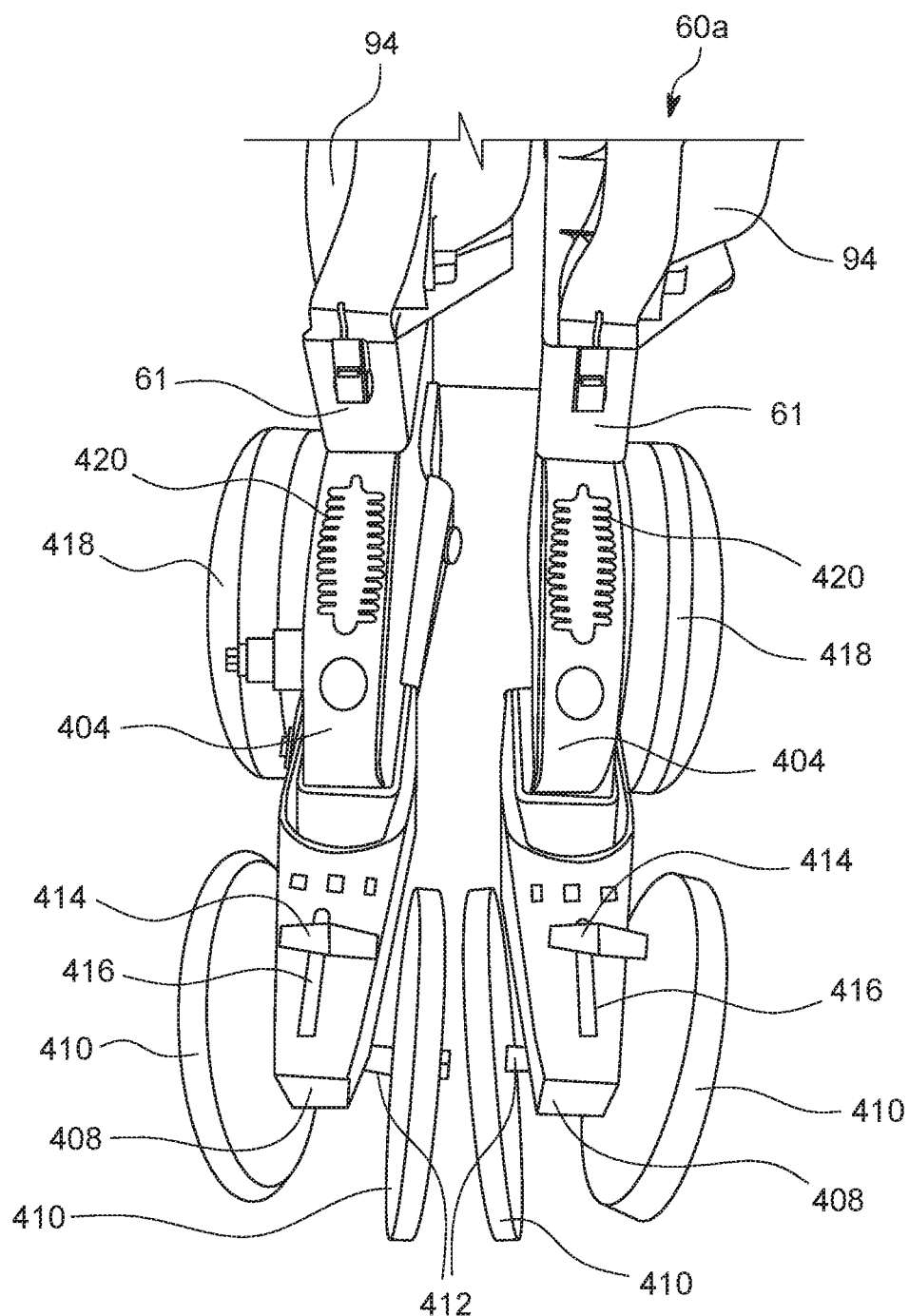
FIG. 6 is a front view of the side-by-side two-row planter of FIG. 5.
Figure 7:
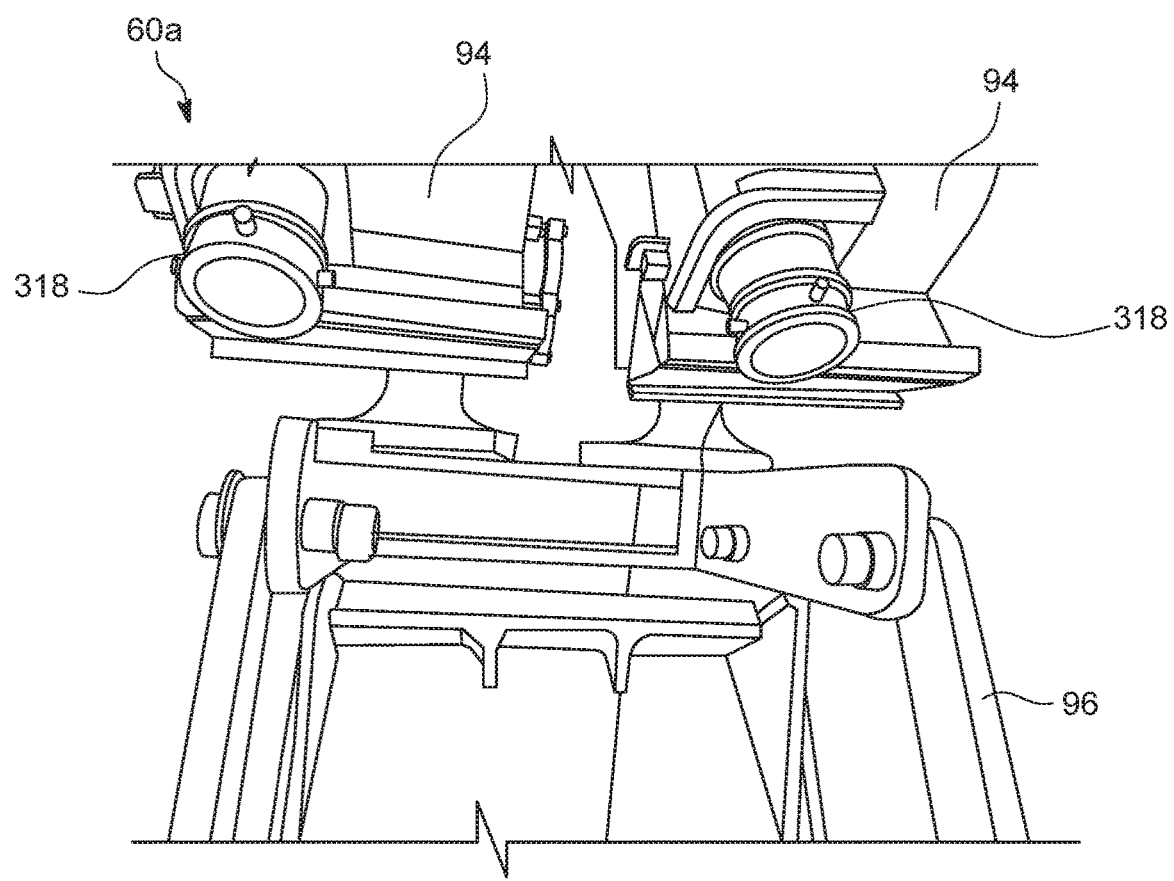
FIG. 7 illustrates a vacuum connection of the side-by-side two-row planter of FIG. 5.
Figure 8:
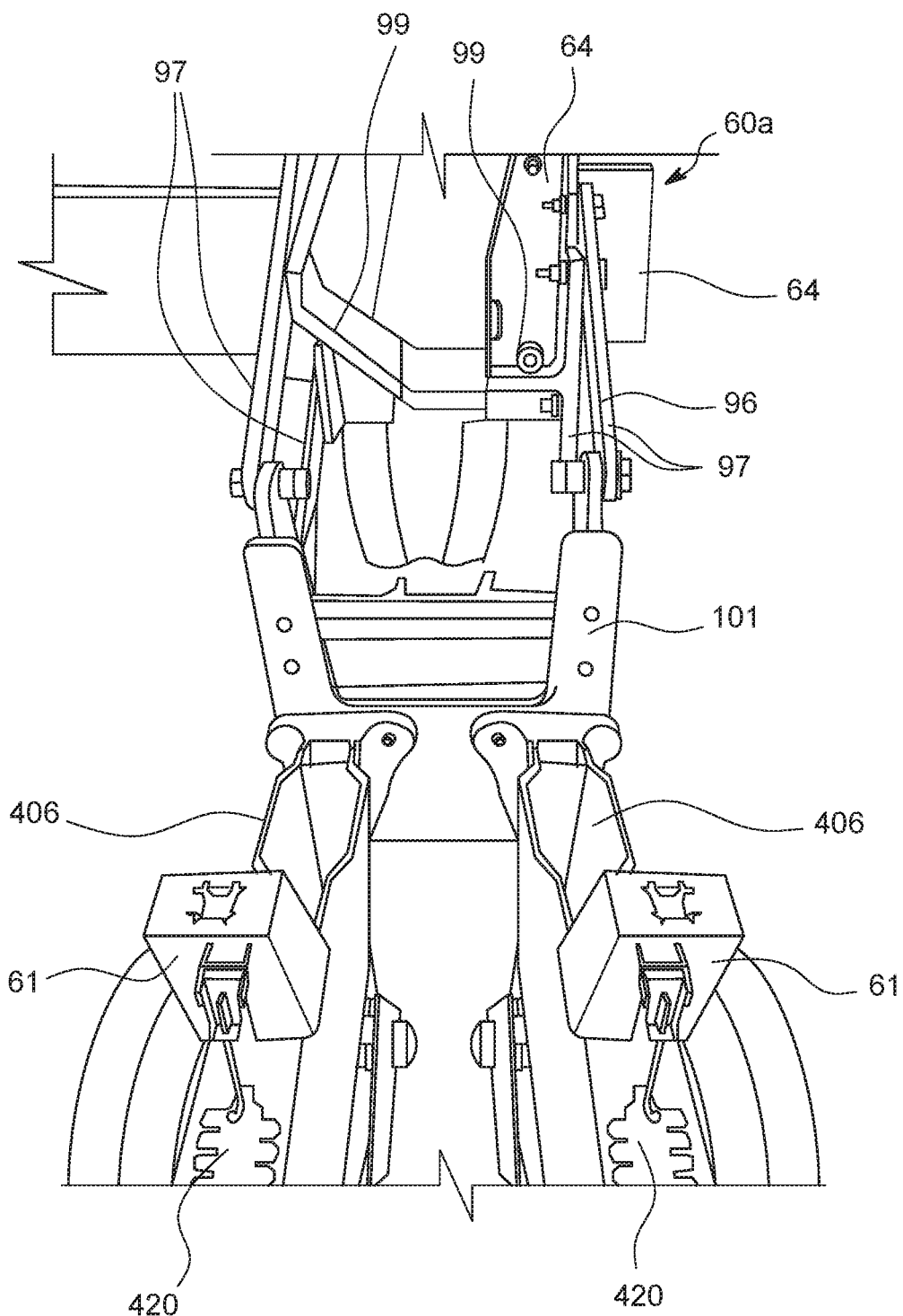
FIG. 8 illustrates the side-by-side two-row planter of FIG. 5 having a first and second seed hopper removed therefrom.
Figure 9:
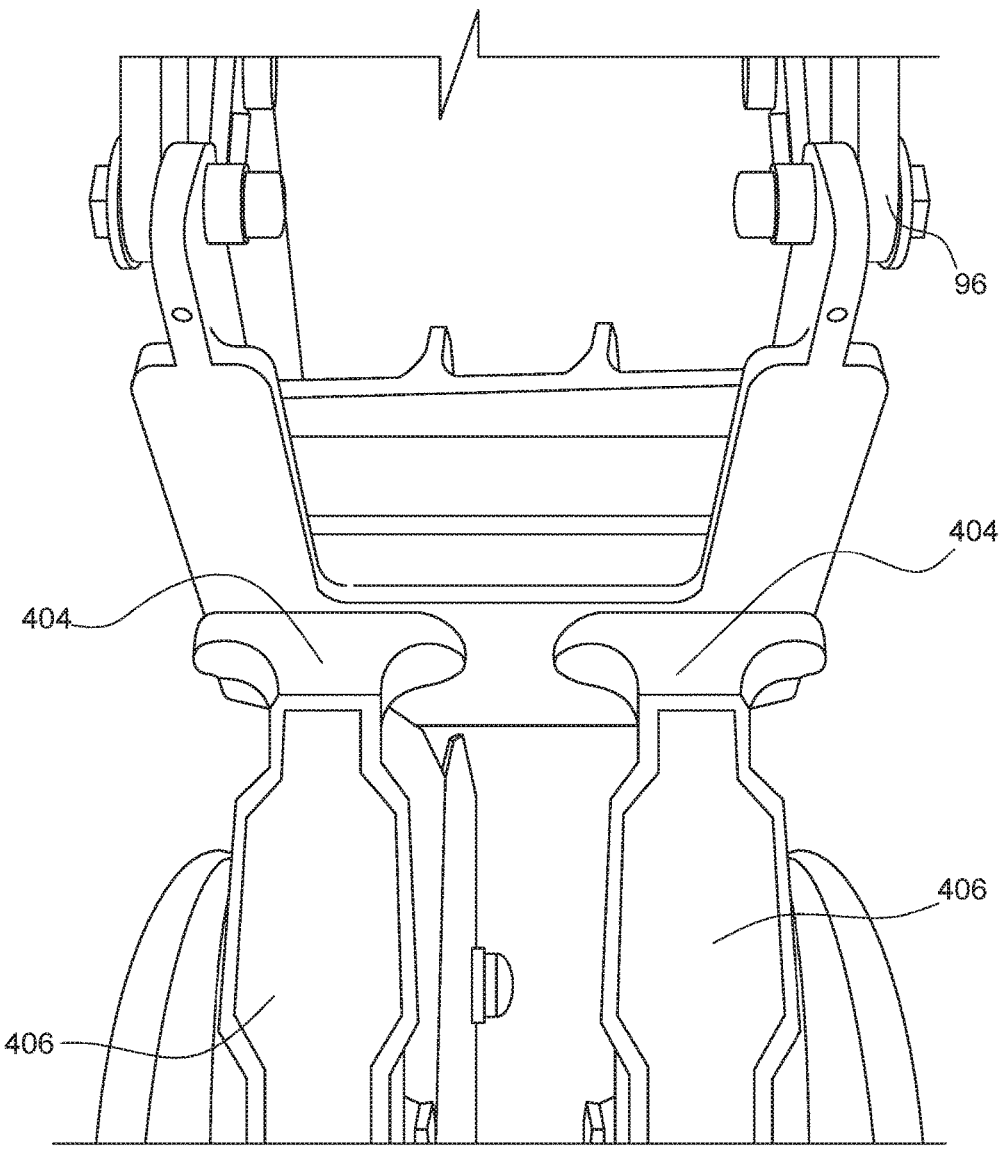
FIG. 9 is a top-down view of the side-by-side two-row planter as shown in FIG. 8.
Figure 10:
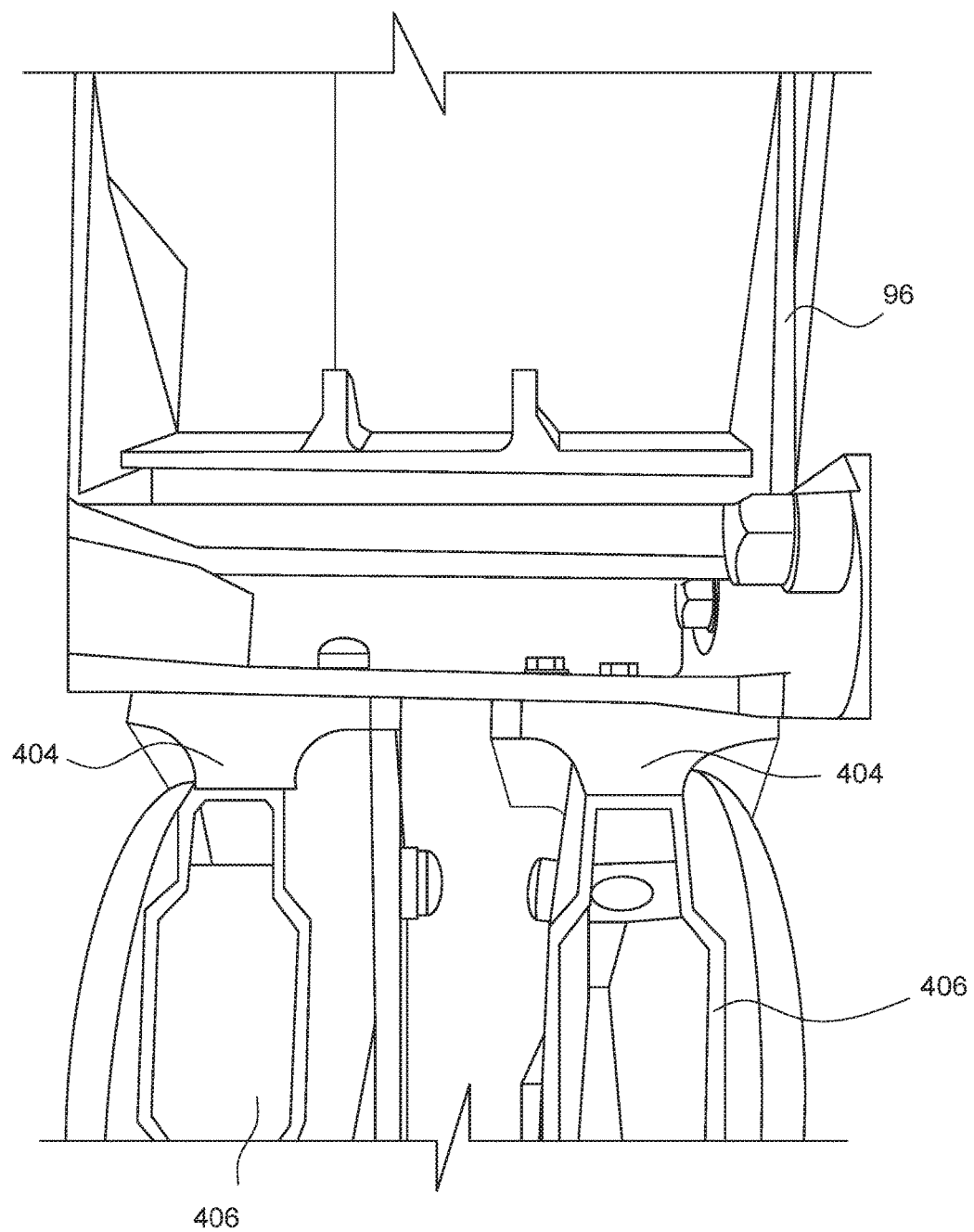
FIG. 10 illustrates a connection between the planters and the support bar of the side-by-side two-row planter of FIG. 5.
Figure 11:
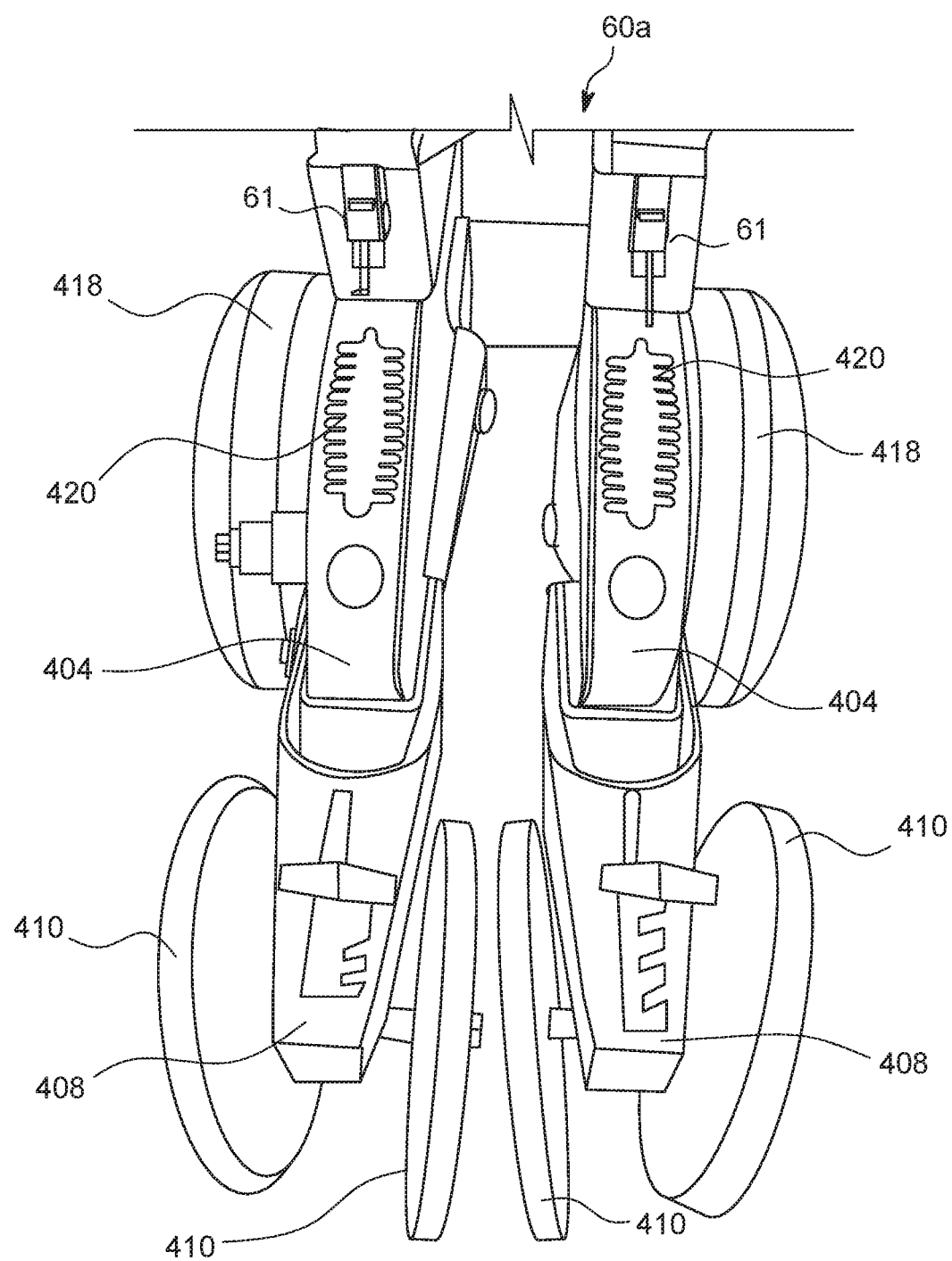
FIG. 11 is a perspective view of a front portion of the side-by-side two-row planter of FIG. 5.
Figure 12:
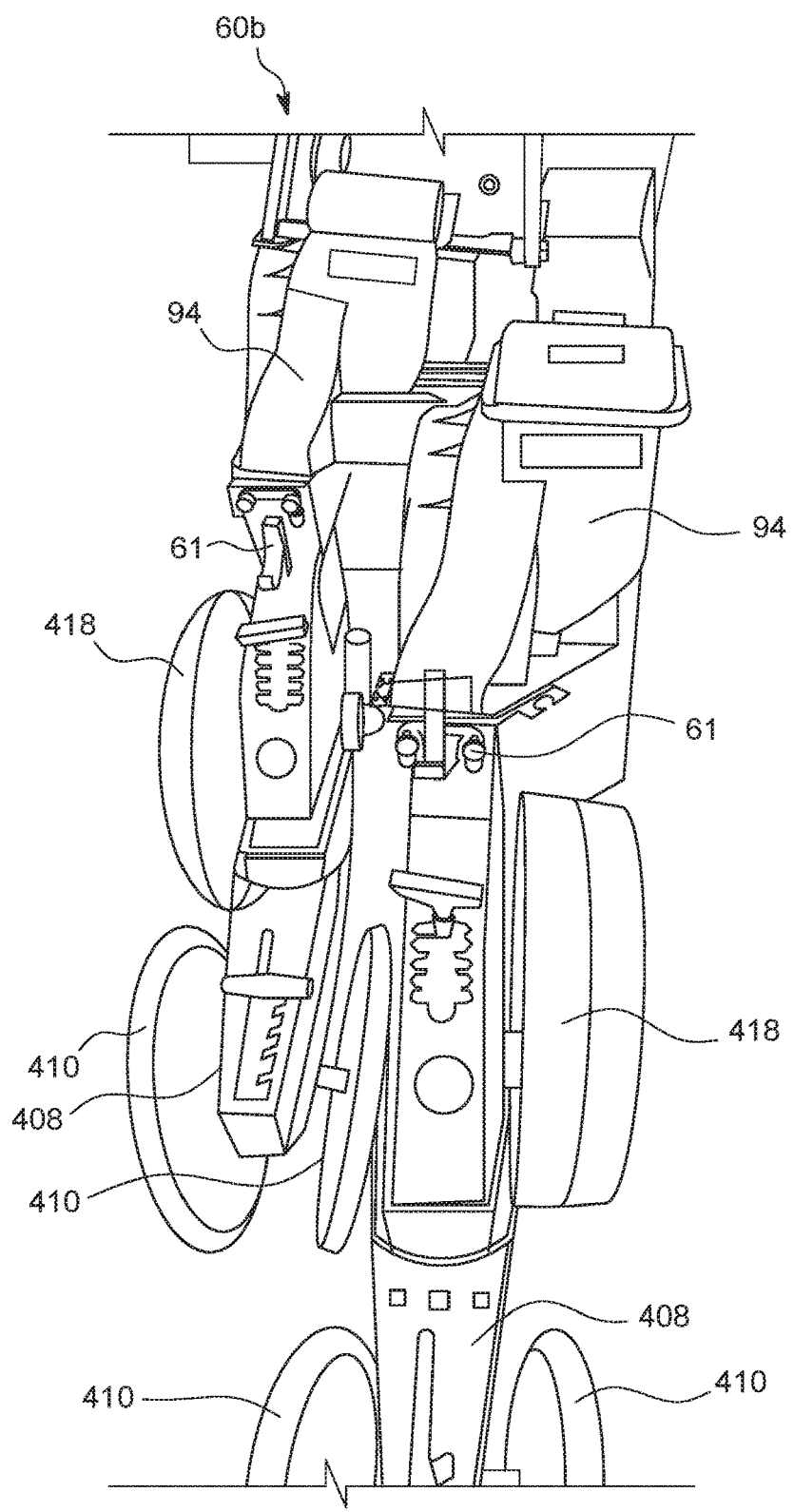
FIG. 12 illustrates one embodiment of a staggered two-row planter configured to couple to a planter bar, in accordance with the present disclosure.
Figure 13:
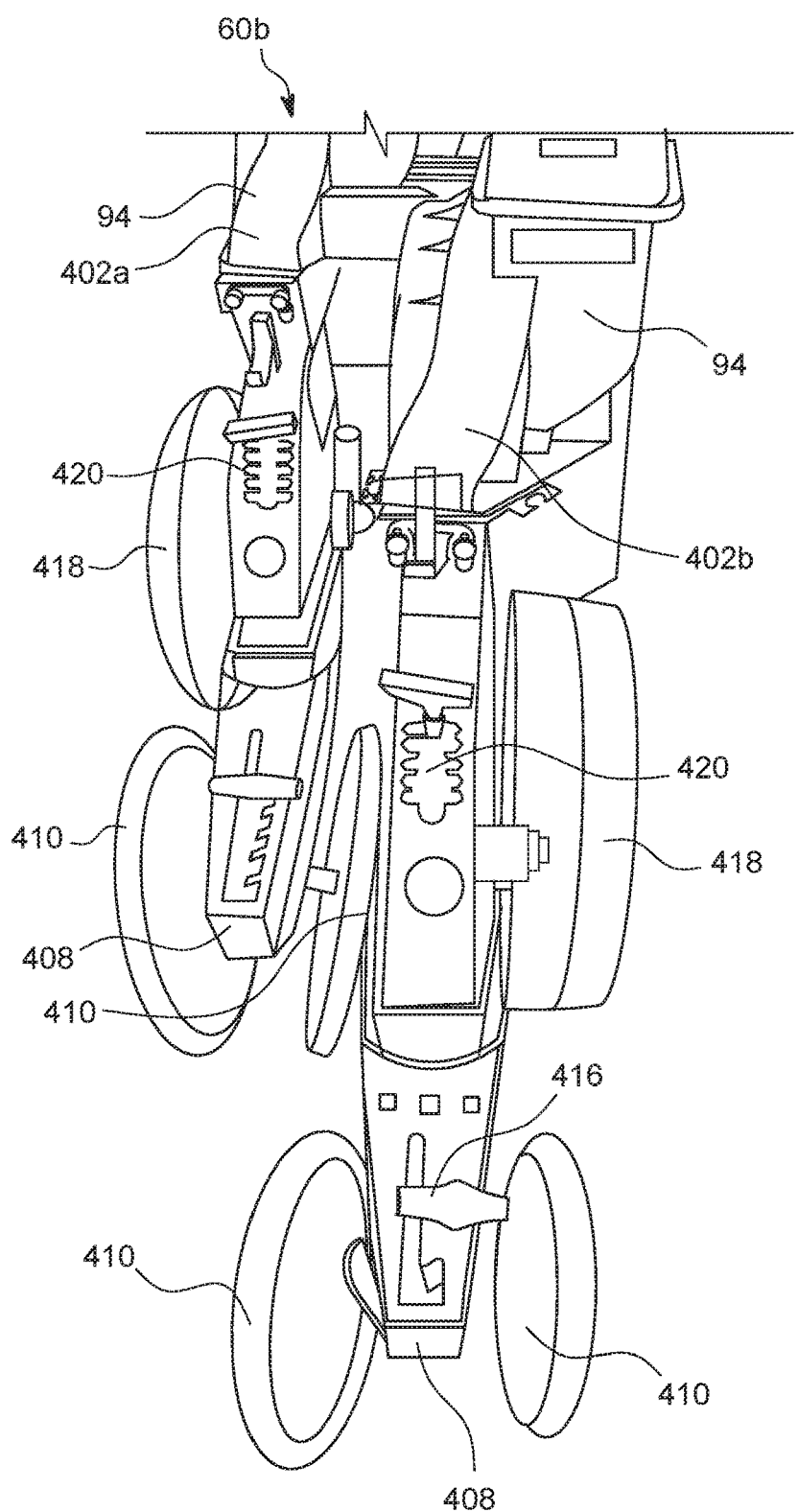
FIG. 13 is a perspective view of a front portion of the staggered two-row planter of FIG. 12.
Figure 14:
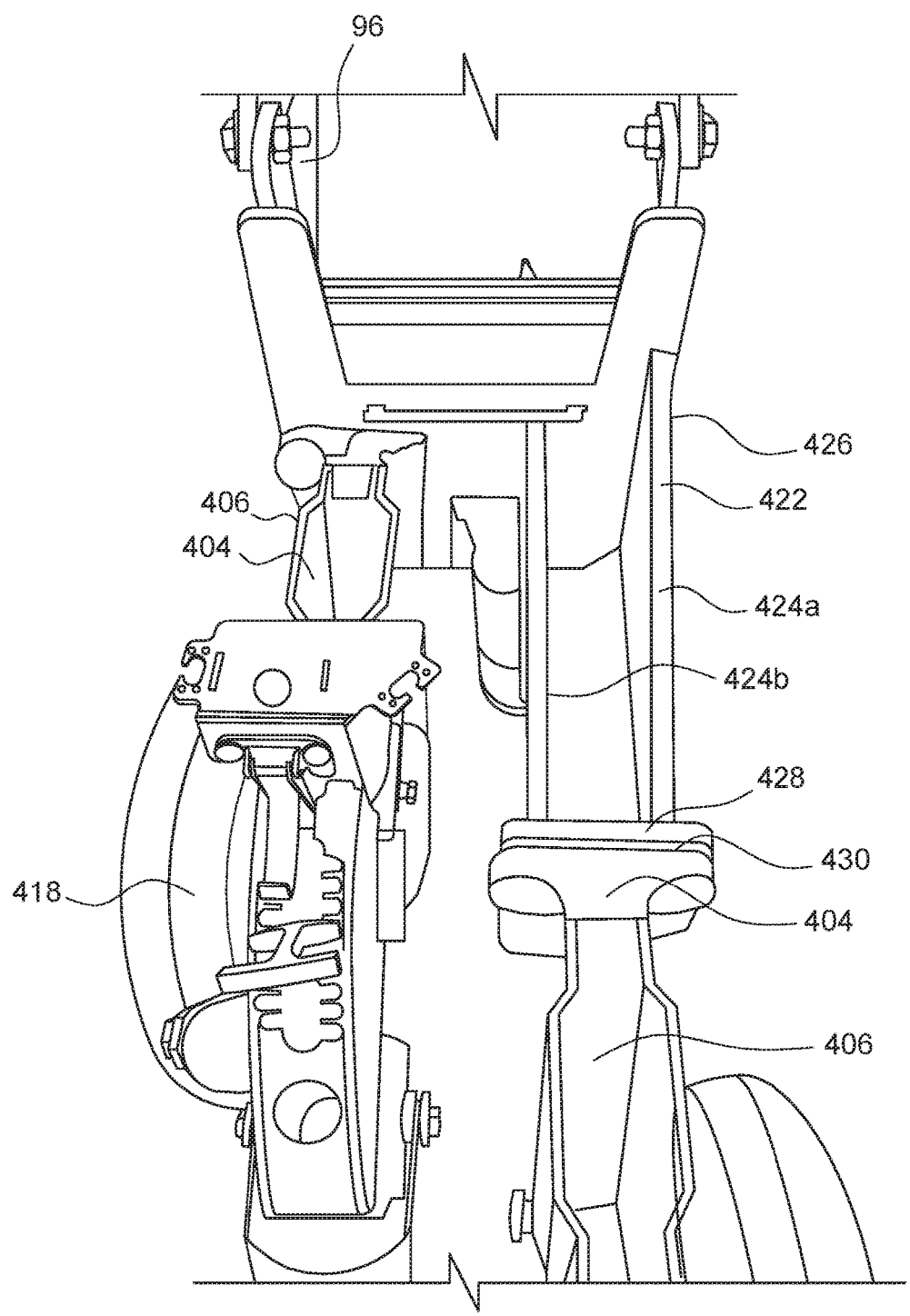
FIG. 14 is a perspective view of the staggered two-row planter of FIG. 12 having a first and second seed hopper removed therefrom.
Figure 15:
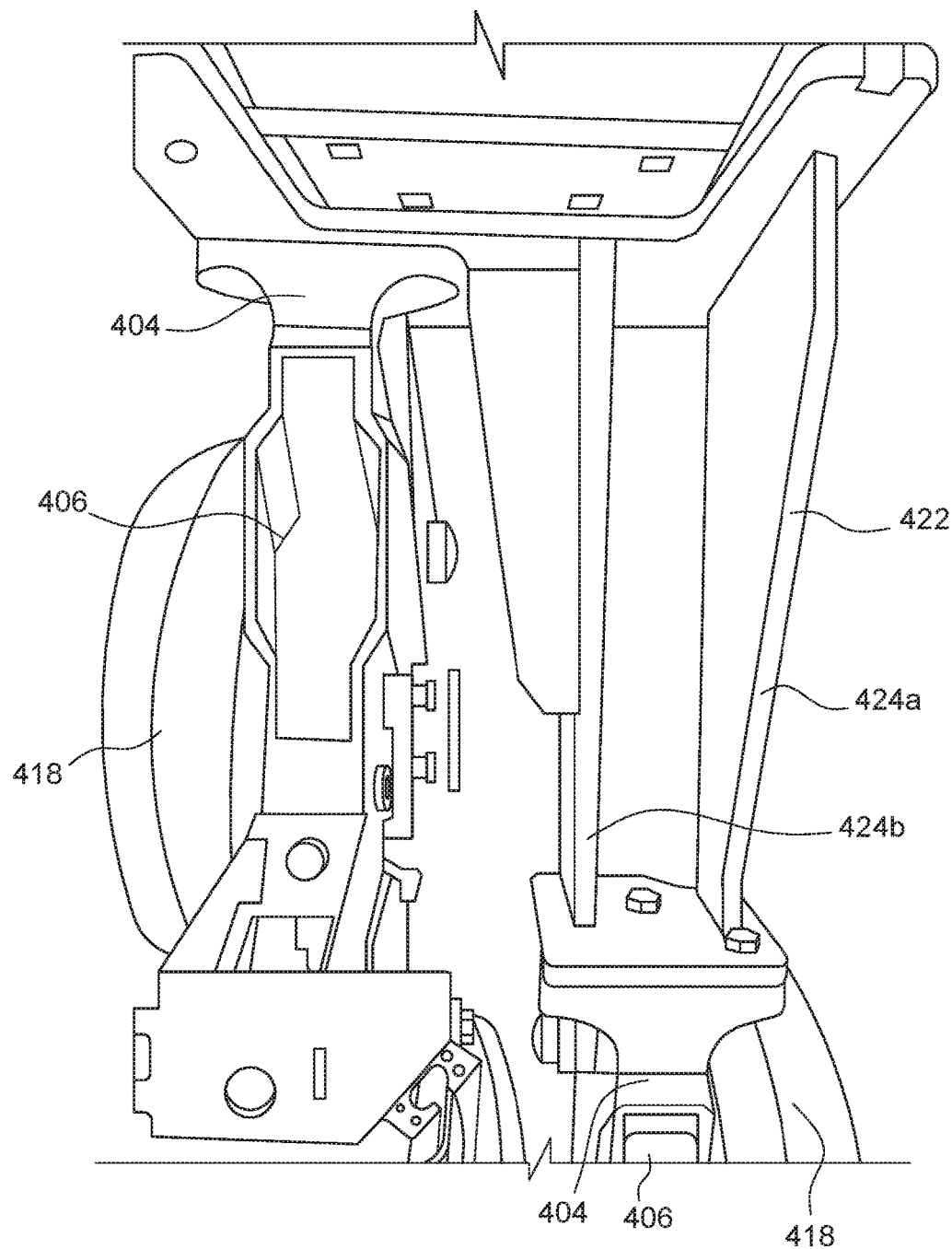
FIG. 15 is a top-down view of the staggered two-row planter as configured in FIG. 14.

In some embodiments, each of the distal wheels 410 and/or the proximal wheels 418 are positioned off-center of a support frame axis. For example, as shown in FIGS. 6 & 11, each of the distal wheels 410 can be positioned on opposite sides of the support frame 404. The proximal wheels 418 are coupled to a side of the support frame 404 corresponding to an outer side of the planter assembly 402. For example, the left planter assembly 402a has a proximal wheel 418 located on a left, outer side of the support frame 404 and a the right planter assembly 402b has a proximal wheel 418 located on a right, outer side of the support frame 404. By positioning the distal wheels 410 and the proximal wheels 416 off of the center axis of the support frame 404, the metering unit can dispense seeds and/or other solids directly below the support frames 404. For example, in some embodiments, a dispenser (not shown) is located along the center axis of the support frame 404 and is configured to distribute seeds in a row aligned with the central axis.

In some embodiments, the multi-row planting unit 60a is configured to dispense seeds and/or other solids from each of the metering units at a predetermined spacing. For example, in some embodiments, the planter assemblies 402 have a spacing configured to dispense seeds to 8" spaced rows. In other embodiments, the planter assemblies 402 can have any suitable spacing for dispensing seeds to simultaneously to any spacing of rows, such as, for example, 6", 8", 10", 12", and/or any spacing within a predetermined range of spacing, such as 6"-10".

Figure 16:
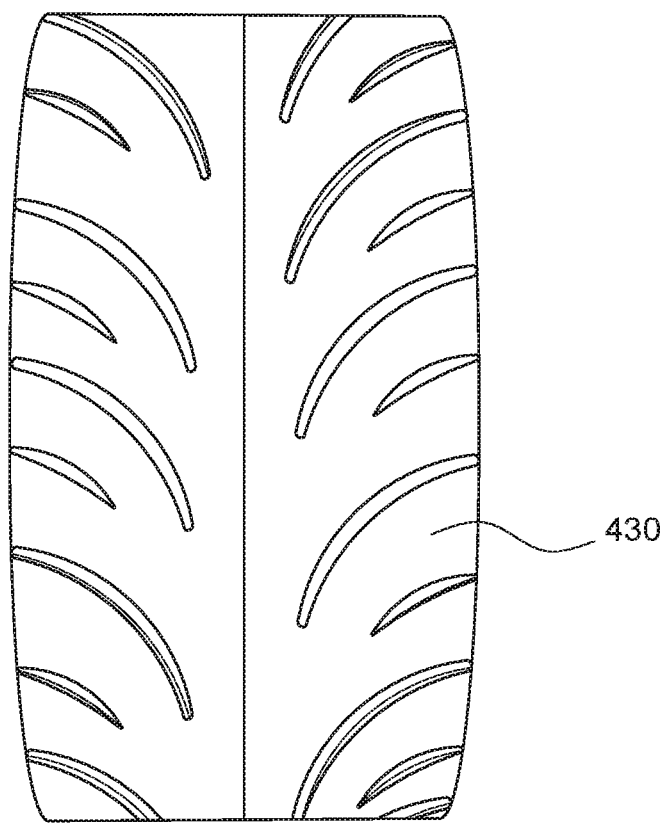
FIG. 16 illustrates one embodiment of a rear wheel configured to couple to a two-row planter, in accordance with the present disclosure.

In some embodiments, each of the planting assemblies 402 can include a trailing wheel 430 (as shown in FIG. 16). In some embodiments, a trailing wheel 430 is coupled to a distal portion of the support frame 404. The trailing wheel 430 is sized and configured to tamp down and/or smooth a section of ground after the metering unit has dispensed one or more seeds. For example, in some embodiments, the trailing wheel 430 has a width sufficient to extend from a first side of the support frame 404 to a second side of the support frame 404. The trailing wheel 430 is placed in contact with the ground distally of the support frame 404 to flatten a section of ground after the metering unit 32 has dispensed one or more seeds.

Figure 17:
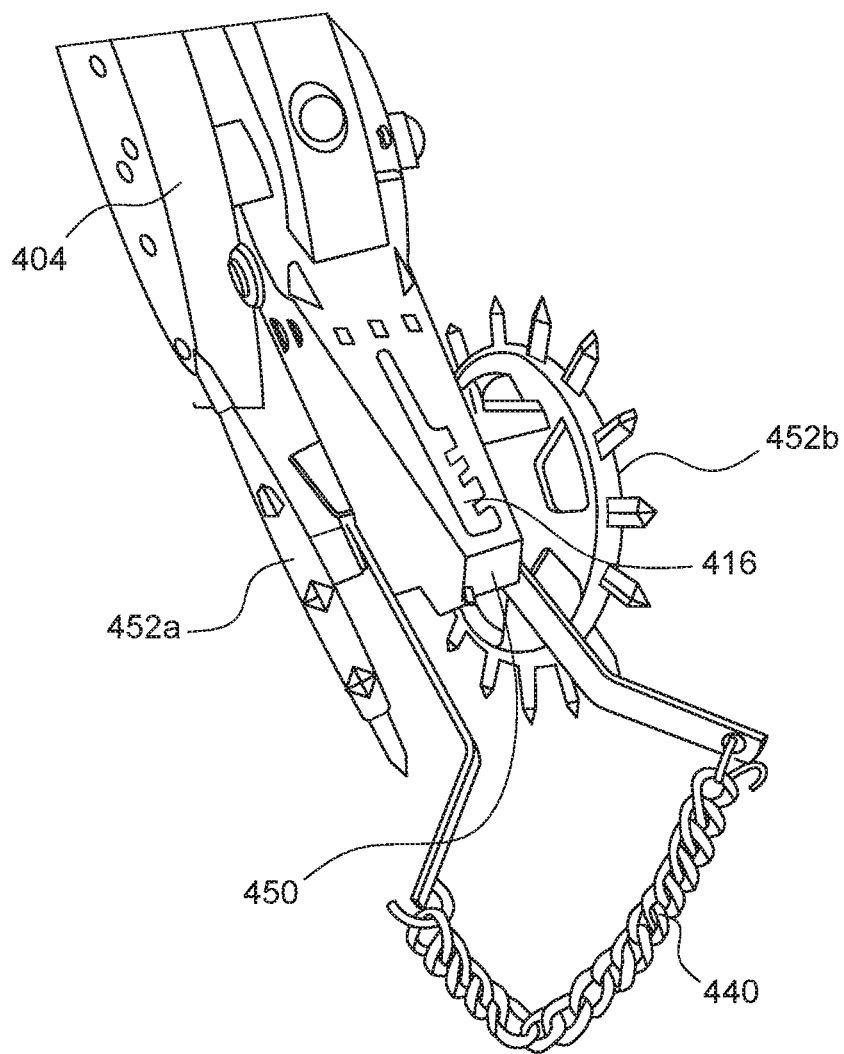
FIG. 17 illustrates one embodiment of a rear drag-chain configured to couple to a two-row planter, in accordance with the present disclosure.

In some embodiments, the each of the planting assemblies 402 can include a trailing chain 440 (shown in FIG. 17). The trailing chain 440 serves a similar function to the trailing wheel 430 discussed above. The trailing chain 440 can be positioned in contact with the ground such that the trailing chain 440 extends from a first side of the support frame 404 to a second side of the support frame 404. The trailing chain 440 is dragged along the ground to smooth the ground and/or cover seeds after the seeds have been dispensed by the planting assemblies 402. The trailing chain 440 can include a predetermined length sufficient to extend from a first side of the planting assembly 402 to a second side. The trailing chain 440 can be taught and/or can include slack such that a portion of the trailing chain 440 forms an arc when in use.

FIGS. 12-15 illustrate one embodiment of a staggered multi-row planting unit 60b. The staggered multi-row planting unit 60b is similar to the side-by-side multi-row planting unit 60a described above, and similar description is not repeated herein. In some embodiments, an extender unit 422 is coupled between a mounting plate 64 and one of the planting assemblies 402 of the multi-row planting unit 60b. The extender unit 422 staggers the position of, for example, a second planting assembly 402b with respect to a first planting assembly 402a. The first planting assembly 402a can be coupled directly to the mounting plate 64. By placing the planting assemblies 402 in a staggered configuration, the spacing of the planting assemblies 402 can be reduced. For example, in some embodiments, the staggered multi-row planting unit 60*b* is configured to dispense seeds from each of the metering units 61 at a spacing less than 8", such as, for example 2", 4", 6", any spacing within a predetermined range, such as 2"-8", and/or any other suitable spacing. It will be appreciated that the staggered multi-row planting unit 60*b* can be configured for any suitable spacing.

In some embodiments, the extender unit 422 includes a first extension arm 424*a* and a second extension arm 424*b* coupled to the mounting plate 64 at a first end 426. A second end 428 of the extension arms 424 are coupled to rear plate 430 of the support frame 404. In some embodiments, the extension arms 424 have a length sufficient to position the hopper 94 of the second planting assembly 402*b* adjacent to the rear wheel 418 of the first planting assembly 402*a*.

In some embodiments, the extender unit 422 is removable. For example, the extender unit 422 can be temporarily coupled between a first planting assembly 402*a* and a mounting plate 64 to provide a first spacing with respect to a second planting assembly 402*b*. One or more rows can be dispensed using the planting assemblies 402 in the first spacing. Subsequently, the extender unit 422 can be removed and the first planting assembly 402*a* can be coupled directly to the mounting plate 64. The first planting assembly 402*a* and the second planting assembly 402*b* have a second spacing when the first planting assembly 402*a* is coupled directly to the mounting plate 64. One or more additional rows can be dispensed with the planting assemblies 402 in the second spacing. In some embodiments, the spacing between the planting assemblies 402 can be adjusted without removing the extender unit 422.

Although embodiments are discussed herein including planting assemblies 402, it will be appreciated that the multi-row planting units 60 can include one or more additional moveable farming units. For example, in some embodiments, a multi-row planting unit 60 includes one or more fertilizer units. One or more of the planting assemblies 402 can be replaced with a fertilizing unit configured to dispense metered fertilizer over a predetermined area. The fertilizing unit couples to the mounting plate 64 similar to the mounting described above for the planting assemblies 402. The fertilizing unit generally operates in a similar manner to the planting assemblies 402 and is compatible with the extender unit 422. In some embodiments, one or more additional movable farming units can be coupled to the mounting plate 64.

Methods of using and operating the multi-row planter system 10 as described herein are also envisioned.

Any and all values or scales in the drawings are merely examples and are not meant to be limiting.

The foregoing is provided for purposes of illustrating, explaining, and describing embodiments of this invention. Modifications and adaptations to these embodiments will be apparent to those skilled in the art and may be made without departing from the scope or spirit of this invention.

What is claimed is:

1. A multi-row planting unit, comprising:
 a first planting assembly coupled to a mounting plate;
 a second planting assembly coupled to the mounting plate; and
 a lifting unit coupled to the mounting plate;
 wherein each of the first planting assembly and the second planting assembly are configured to dispense a solid from a metering unit,
 wherein the first and second planting assemblies are coupled to an end of the lifting unit opposite the mounting plate, and
 wherein the metering unit of the first planting assembly is positioned to dispense the solid at a predetermined spacing with respect to the solid dispensed from the metering unit of the second planting assembly.

2. The multi-row planting unit of claim 1, each of the first planting assembly and the second planting assembly comprising:
 a support frame;
 a proximal wheel coupled to a proximal portion of the support frame; and
 a distal wheel assembly coupled to a distal end of the support frame,
 wherein the distal wheel assembly comprises a first wheel and a second wheel coupled by an axle.

3. The multi-row planting unit of claim 2, wherein the proximal wheel is adjustable between a first height and a second height.

4. The multi-row planting unit of claim 2, wherein at least one of the first planting assembly and the second planting assembly comprise a trailing wheel coupled to a distal portion of the support frame.

5. The multi-row planting unit of claim 2, wherein at least one of the first planting assembly and the second planting assembly comprise a trailing chain coupled to a distal portion of the support frame.

6. The multi-row planting assembly of claim 2, wherein at least one of the proximal wheel and/or the distal wheel assembly is positioned off-center of a central axis of the support frame.

7. The multi-row planting assembly of claim 6, wherein the proximal wheel of the first planting assembly is located on an outer side of the first planting assembly and the proximal wheel of the second planting assembly is located on an outer side of the second planting assembly.

8. The multi-row planting unit of claim 1, wherein each of the first planting assembly and the second planting assembly comprise a hopper, a metering unit, and a vacuum connection,
 wherein the hopper is coupled to the metering unit, and
 wherein the metering unit is configured to dispense one or more solids from the hopper when the vacuum connection is coupled to a vacuum source.

9. The multi-row planting unit of claim 1, wherein the first planting assembly and the second planting assembly are parallel.

10. The multi-row planting unit of claim 1, comprising an extension unit coupled between at least one of the planting assemblies and the mounting plate,
 wherein the extension unit is configured to position the first planting assembly and the second planting assembly in a staggered configuration.

11. The multi-row planting unit of claim 1, wherein the predetermined spacing is a spacing of about 6" to about 10".

12. A system for dispensing a solid, comprising:
 a planter bar; and
 a multi-row planting unit, comprising:
 a mounting plate configured to be coupled to the planter bar;
 a first planting assembly coupled to the mounting plate;
 a second planting assembly coupled to the mounting plate; and
 a lifting unit coupled to the mounting plate;
 wherein each of the first planting assembly and the second planting assembly are configured to dispense a solid from a metering unit, wherein the first and second planting assemblies are coupled to an end of the lifting unit opposite the mounting plate, and wherein the metering unit of the first planting assembly is positioned to dispense the solid at a predetermined spacing with respect to the solid dispensed from the metering unit of the second planting assembly.

13. The system of claim 12, wherein the mounting plate is coupled to the planter bar by a plurality of clips.

14. The system of claim 12, wherein each of the first planting assembly and the second planting assembly comprises a hopper, a metering unit, and a vacuum connection, wherein the hopper is coupled to the metering unit, and wherein the metering unit is configured to dispense one or more solids from the hopper when the vacuum connection is coupled to a vacuum source.

15. The system of claim 12, comprising a vacuum source coupled to the vacuum connection of the first and second planting assemblies, wherein the vacuum source is configured to control a rate at which the solid is dispensed.

16. The system of claim 12, each of the first planting assembly and the second planting assembly comprising:

a support frame;

a proximal wheel coupled to a proximal portion of the support frame; and a distal wheel assembly coupled to a distal end of the support frame, wherein the distal wheel assembly comprises a first wheel and a second wheel coupled by an axle.

17. A method of dispensing a solid, comprising:

coupling a multi-row planting unit to a vehicle, the multi-row planting unit comprising a mounting plate configured to be coupled to a planter bar, a first planting assembly coupled to the mounting plate, a second planting assembly coupled to the mounting plate, and a lifting unit coupled to the mounting plate, wherein the first planting assembly and the second planting assembly are coupled to an end of the lifting unit opposite the mounting plate;

pulling the multi-row planting unit behind the vehicle at a predetermined rate of speed; and dispensing a solid from a metering unit in each of the first and second planting assemblies, wherein the metering unit of the first planting assembly is positioned to dispense the solid at a first predetermined spacing with respect to the solid dispensed from the metering unit of the second planting assembly.

18. The method of claim 17, comprising:

uncoupling the first planting assembly from the mounting plate;

coupling an extension unit to the mounting plate; and coupling the first planting assembly to the extension unit, wherein the extension unit is configured to position the first planting assembly and the second planting assembly in a staggered configuration, and wherein the extension unit positions the first planting assembly to dispense the solid at a second predetermined spacing with respect to the solid dispensed from the second planting assembly.

19. The method of claim 17, comprising adjusting a height of a proximal wheel of one of the first planting assembly or the second planting assembly.

* * * * *